(12) United States Patent
Loen

(10) Patent No.: US 7,171,759 B1
(45) Date of Patent: Feb. 6, 2007

(54) METHOD AND APPARATUS TO ACCURATELY MEASURE THE ANGULAR ORIENTATION OF TWO SURFACES

(76) Inventor: Mark Vincent Loen, 1817 N. Dobson Rd., Apt 1066, Chandler, AZ (US) 85224

( * ) Notice: Subject to any disclaimer, the term of this patent is extended or adjusted under 35 U.S.C. 154(b) by 0 days.

(21) Appl. No.: 11/190,622

(22) Filed: Jul. 28, 2005

Related U.S. Application Data

(63) Continuation-in-part of application No. 10/802,338, filed on Mar. 18, 2004, now Pat. No. 6,983,549.

(60) Provisional application No. 60/474,799, filed on Jun. 2, 2003, provisional application No. 60/687,121, filed on Jun. 6, 2005.

(51) Int. Cl.
*G01B 5/24* (2006.01)

(52) U.S. Cl. .................. 33/657; 33/645; 33/412; 33/1 N

(58) Field of Classification Search ............. 33/1 BB, 33/1 LE, 1 N, 193, 281, 282, 285, 286, 288, 33/412, 529, 533, 534, 535, 538, 613, 615, 33/618, 619, 620, 621, 645, 655, 657, 700, 33/701, 832, 833
See application file for complete search history.

(56) References Cited

U.S. PATENT DOCUMENTS

| | | | |
|---|---|---|---|
| 793,027 A | 6/1905 | Burton | |
| 898,349 A | 9/1908 | Fielding | |
| 2,050,725 A | 8/1936 | Messinger | |
| 2,054,530 A | 9/1936 | Williams | |
| 2,788,584 A * | 4/1957 | Adrien ................ | 33/645 |
| 3,552,859 A | 1/1971 | Snyder, III | |
| 3,834,820 A | 9/1974 | Bock | |
| 3,902,810 A | 9/1975 | Hamar | |
| 3,947,970 A | 4/1976 | Lesure | |
| 4,088,409 A | 5/1978 | Furness | |
| 4,266,342 A * | 5/1981 | Cors et al. ........... | 33/1 Q |
| 4,272,317 A | 6/1981 | Roerig | |
| 4,290,289 A | 9/1981 | Capriotti | |
| 4,298,281 A | 11/1981 | Schave | |
| 4,319,406 A | 3/1982 | Pehrson, Sr. et al. | |
| 4,473,954 A * | 10/1984 | Vilches ............... | 33/505 |
| 4,573,274 A | 3/1986 | Albert | |
| 4,958,439 A * | 9/1990 | Dehn ................. | 33/608 |
| 5,075,980 A | 12/1991 | Kerman | |
| 5,123,736 A | 6/1992 | Pierik et al. | |
| 5,430,539 A | 7/1995 | Lysen | |
| 5,579,585 A | 12/1996 | Schaeffer | |
| 5,949,684 A | 9/1999 | Kirkwood-Azmat | |
| 6,049,378 A | 4/2000 | Busch et al. | |
| 6,470,581 B1 * | 10/2002 | Kolodzieski ........... | 33/414 |
| 6,628,378 B1 | 9/2003 | Marangoni et al. | |
| 6,763,597 B2 | 7/2004 | Lysen | |
| 6,889,441 B2 | 5/2005 | Seiffert | |
| 2004/0239917 A1 | 12/2004 | Loen | |
| 2005/0041236 A1 | 2/2005 | Loen | |
| 2005/0052640 A1 | 3/2005 | Loen | |

FOREIGN PATENT DOCUMENTS

JP 60178301 A * 9/1985

* cited by examiner

Primary Examiner—R. Alexander Smith

(57) ABSTRACT

A method and apparatus are disclosed to measure the angular orientation of two surfaces. The device consists of two frames which are aligned to the surfaces. A continuous string is routed between the frames and put under tension. A position indicating instrument on one mounting frame monitors the string position. The frames are then flipped over or switched between surfaces. The string is tensioned a second time. The measured change in string position is used to determine the angular orientation.

6 Claims, 5 Drawing Sheets

US 7,171,759 B1

METHOD AND APPARATUS TO ACCURATELY MEASURE THE ANGULAR ORIENTATION OF TWO SURFACES

RELATED APPLICATIONS

This application claims the benefit of U.S. Provisional Patent Application Ser. No. 60/687,121 filed on Jun. 6, 2005. This application is also a continuation in part of U.S. patent application Ser. No. 10/802,338 filed on Mar. 18, 2004 now U.S. Pat. No. 6,983,549 which claims the benefit of U.S. Provisional Patent Application No. 60/474,799 filed on Jun. 2, 2003.

STATEMENT REGARDING FEDERALLY SPONSORED RESEARCH OR DEVELOPMENT

Not applicable.

REFERENCE TO SEQUENCE LISTING, A TABLE, OR COMPUTER PROGRAM LISTING

Not applicable.

BACKGROUND OF THE INVENTION

1. Field of the Invention

The present invention is generally directed to measuring the relative angular orientation of two surfaces.

2. Discussion of Similar Art

The most common angular orientation measuring method involves using surveyor techniques to measure the position of a roll against a nearby offset reference line as disclosed by Loen, U.S. patent application Ser. No. 10/802,338 filed on Mar. 18, 2004. Other patents have been granted that use various lasers, sighting instruments, attaching fixtures, surveyor instruments, mirrors, targets, scales, and computers. These devices have unique features that allow an operator to measure angular orientation, especially parallel and perpendicular orientation, to various degrees of accuracy.

For example, U.S. Pat. No. 6,049,378 by Busch, et. al. describes an alignment measuring system where a gyroscope with positional sensors are used to determine the angular orientation of an object, such as a roll. The measuring apparatus is very expensive due to the electronics necessary to measure small angular orientation angles. U.S. Pat. No. 5,430,539 by Lysen, uses multiple laser beams, targets, and a computer to determine angular orientation. The methods described are complicated, stationary, and limited to a particular measurement of two fixed and adjacent rolls. U.S. Pat. No. 4,298,281 by Schave describes an offset system where a light beam is aligned to an offset reference line and the beam is reflected off the roll ends to measure angular orientation. For accuracy, this method depends heavily on aligning the light beam to an offset reference line. It also requires that the roll ends correctly reflect the angular orientation of the roll's working surface.

Other angular orientation measuring patents have significant limitations. Some are designed to measure the orientation of very specific surfaces. Others have practical restrictions where the methods disclosed are difficult to implement due to poor access to the surfaces needed for the orientation measurement. Many of the disclosed methods are based on nearby reference lines. The measuring equipment must first be adjusted or calibrated against those lines. This requires an additional time consuming step. Many of the techniques already patented require specialized training in order to ensure accurate measurements. Often, a separate and specially trained crew is required to make the measurements.

Further, many of the methods patented are relatively expensive due to the use of multiple precision components. Also, as a practical matter, it is easy to drop precision equipment and damage delicate instruments. Diode lasers, for example, are easily damaged or loose calibration when dropped. Some of the methods require heavy instruments that are difficult for an operator to lift and place upon the surface to be measured.

It is also important to provide for a high level of confidence in the angular measurement. Some orientation measuring methods require the use of lasers that are subject to thermal drift. This lowers confidence in any measurement that requires the laser beam projection angle to be consistent with calibration of the instrument. The device and method of this invention do not require any angular calibration system to check its accuracy.

3. Objects and Advantages

It is therefore desirable to provide a convenient, accurate, quick, reliable, affordable, and simple method of measuring surface to surface orientation without the need for specialized training. Consideration is given to creating a measuring instrument that is robust and easy to use. It is also designed to provide for accurate measurement which is free of the need for angular calibration of the measuring device.

It is further an object of this invention to measure the orientation of a wide variety of surfaces. The surfaces to be measured may be straight, curved, flat, convex, or concave. The surface may be defined by multiple objects. The mounting frames may include matching curves or surfaces to provide for accurate angular orientation measurements. An important objective of this invention is to measure the angular orientation of two rolls.

SUMMARY OF THE INVENTION

Accordingly, it is the object of this invention to provide convenient, direct, quick, inexpensive, and accurate orientation angle measurement of two surfaces.

DETAILED DESCRIPTION OF THE DRAWINGS

Figure 1A:
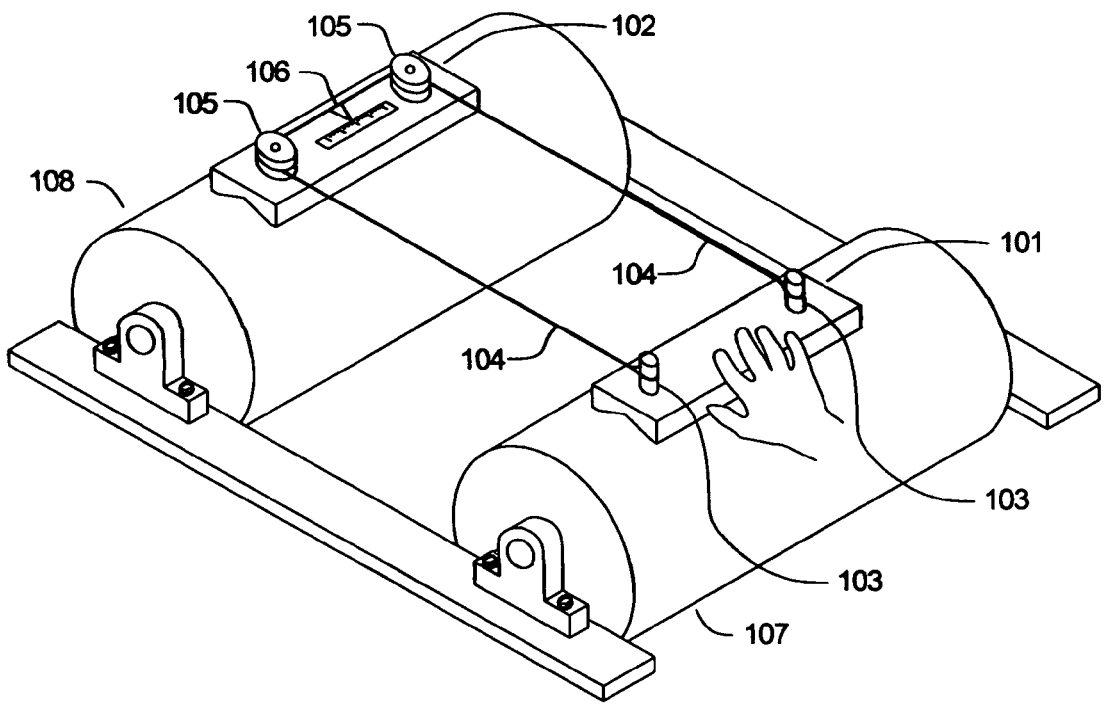
FIGS. 1A and 1B show a preferred embodiment where the angular orientation between two nearly parallel rolls is measured.

In general, the device consists of two frames that are temporarily attached to the surfaces to be measured. The frames are adapted to be mounted on the surfaces in a repeatable, aligned condition. Various surfaces and grooves may be incorporated into the mounting frames to adapt them to any number of matching surfaces.

It is especially useful to adapt the invention to measure the near parallel angular orientation between two rolls. In this case, two mounting frames are mounted on the radial surfaces of the rolls. The frames are designed to be aligned to the roll central longitudinal axis by a v shaped surface.

The angular orientation is detected by using a string under tension. A string is routed between the two mounting frames in a defined path so that two line segments between the two mounting frames are established. As part of the measuring technique, the relative angular orientation of the two frames is reversed. This causes the string position on one mounting frame to shift. The positional shift is directly related to the angular orientation and is monitored by a string position indicating instrument.

The term string is defined to be an elongated slender member that is stiff under tension. The term string would include, but not be limited to, a narrow strap, wire, fine chain, twine, thread, lacing, yarn, cord, filament, belt, and rope. It is preferable to use a string material that does not significantly lengthen under moderate tension. The string may be covered with a protecting material such as paint or wax.

The device is particularly suited to measuring small orientation angles very accurately. A highly accurate small angle measurement is obtained by using a measuring instrument with fine position resolution to measure the string shift. Devices such as dial indicators, vernier scales, and other instruments may be used.

Even string tension may be provided by a spring tensioning unit built into one mounting frame. However, experienced operators may provide a constant string tension by feel. The use of a tensioning unit is only one possible embodiment of the invention.

The two surfaces may be any distance apart. Surfaces that are very far apart may be accurately measured. When the surfaces are far apart, the string segments between the two frames may sag. In general, the string should be allowed to sag. It is possible to lift the strings to remove sag, but this will reduce the angular measurement accuracy. In the field, it is difficult to support the string in a manner that will not disturb the measuring accuracy. When there is significant string sag, a string tension monitoring device may be employed to keep the string sag equal for both string position readings.

The angular orientation measurement is a relative orientation between the two surfaces.

When measuring angular orientation, the string tension may create a tendency for the mounting frames to lift off of the surfaces. This problem is avoided if each frame is held in place by an operator, or a strap may be employed to attach the mounting frame to the surface.

The measuring method provides two ways for the string position indicating instrument to reveal the angular orientation. After the first reading is taken, the frames may be picked up together, rotated 180°, and then each flame is then placed on the same surface location. The end result is that the frames are flipped over. Alternately, and equally, the frames may be switched between the two surfaces and the frames placed in each other's position on the surfaces. Either action will cause the string to shift in a manner that will reveal the angular orientation between the surfaces by a change in the string position indicating instrument reading.

Minor variances in re-positioning the frames on the surfaces for the second reading do not present accuracy problems, provided however, that the string tension is returned to approximately the same value and the mounting frames are correctly aligned to the surfaces.

Minor variances in string tension do not normally present accuracy problems provided that the string is completely under tension without significant sag. Minor tension variances will only cause the string to stretch evenly throughout its length and not affect the string position indicating instrument reading. However, larger tension variances will cause accuracy problems if the string sag changes, or if there is a large orientation angle to be measured when the mounting frames are close together. In the latter case, the string may not stretch equally under tension because one string segment between the frames is significantly longer. An alert operator can avoid unequal string stretching by attaching the string position indicating instrument at the center of the continuous string when measuring surfaces are close together.

The angular orientation is measured by the change in the reading of the string position indicating instrument:

$$\beta = K_o \sin^{-1}\left(\frac{Reading1 - Reading2}{W}\right) \quad (1)$$

where $\beta$ is the non-parallel angular orientation between the two surfaces. $\beta$ is zero when the surfaces are parallel. W is the distance between the string segment ends at either frame, and $K_O$ is a correction factor from the following table:

| | Measured Angle | | | | |
|---|---|---|---|---|---|
| L/W | ≤5° | 15° | 25° | 35° | 45° |
| 0.25 | 1 | 1.003 | 1.089 | | |
| 0.5 | 1 | 1.001 | 1.006 | 1.031 | |
| 1 | 1 | 1 | 1.001 | 1.005 | 1.017 |
| 2 | 1 | 1 | 1 | 1.001 | 1.004 |
| 6+ | 1 | 1 | 1 | 1 | 1 |

L is the average length of the two string segments between the two frames.

The calculation in equation (1) includes the correction factor $K_O$ because the string segments between the two frames are not parallel for larger angular measurements. In actual fact, they are close to parallel for smaller angular measurements. However, as the measuring angle becomes larger, the string segments between the two frames are no longer parallel and a correcting factor needs to be applied. The above table may need minor modifications, depending upon the exact geometry of the string routing on the frames. The exact correction may be determined by carefully creating the geometry in a computer, or by measuring the needed correction in a laboratory fixture.

Another embodiment of the invention is to provide for a variable string routing on one frame. For example, the string width between the two frames may be kept constant by allowing an initial adjustment of the defined path on one frame prior to any string position measurements. For example, the width of the string segments at one frame may have a pin with an adjustable position. The width may be varied by the operator so that the string segments are parallel. For best accuracy, the string segments between the two frames should be kept at the same angle relative to one of the frames.

The two string segments between the frames define the angle measuring plane. The direction of the string shift will also reveal which way the angle θ is oriented. On the second reading, the string will shift toward the mounting frame ends that are further apart.

The angular orientation calculation assumes that the continuous string segments between the two mounting frames are substantially the same plane. Out of plane twist is detrimental to the angular measurement. Fortunately, the equipment surfaces to be measured are normally in the same plane. The allowable out of plane twist varies with the distance between the mounting frames and the desired measuring error. Preferably, the out of plane twist is no more than 110. The position of the string segments between the mounting frames defines the plane of measurement. For the case where there is some minor twist, the plane of measurement is closely approximated by an average of the two planes defined by one segment and the middle point in the other segment.

The angular calculation also assumes that there is not a significant offset of the frames in the direction parallel to the surfaces being measured. That is, the two string segments between the frames are substantially symmetric to the center of one of the frames. For small angular measurements, an offset will not significantly affect the measurement. For accurate large angle measurements, the offset should be minimized. The offset can be monitored and corrected by measuring the angle of each line segment to one of the frames. A protractor will normally be accurate enough to measure any significant offset.

The string should be routed around each mounting frame within a defined path. Various grooves or guides may be used to ensure that any string movement seen by the string position indicating instrument is only due to the angular shift between the frames, not a change in string path. For example, if a grooved pulley wheel is used to guide the string, an error will occur if the string slips out of the groove between the two readings. It is preferable to keep the string substantially within a single plane on each mounting frame. However, this is not a strict requirement. It is only important that the string path is consistent for both readings. The method is very tolerant of different string routings on the mounting frames. The string routing planes on each frame do not have to line up to the angular measuring plane.

The defined path on each mounting frame will need to prevent any string binding. The string should be free to move and shift when under tension. Any bending of the string in the defined path tends to be more accurate if the bending radius is smaller rather than larger.

The string position indicating instrument may be made from a wide variety of devices well known in the art. Scales with a pointer, vernier scales, adaptations of dial indicators, calipers, a rotary dial on a rack and pinion, electronic scales, electronic length measuring devices, and non-contact measuring instruments may be employed. It is important that the measuring instrument does not restrict the movement of the string within its defined path. The string position indicating instrument may be adapted from many existing designs which are shock resistant and require very infrequent calibration.

The mounting frames may be made from a wide variety of materials. Metals, plastics, rubbers, and wood may be used. Preferably, a solid material is chosen that can be accurately and consistently aligned with the surface to be measured. It is important that the mounting frame material does not damage the surface to be measured and is resistant to wear.

As a convenience item, vial levels may be placed on the mounting frames to measure how level to earth the surfaces are.

Figure 1B:
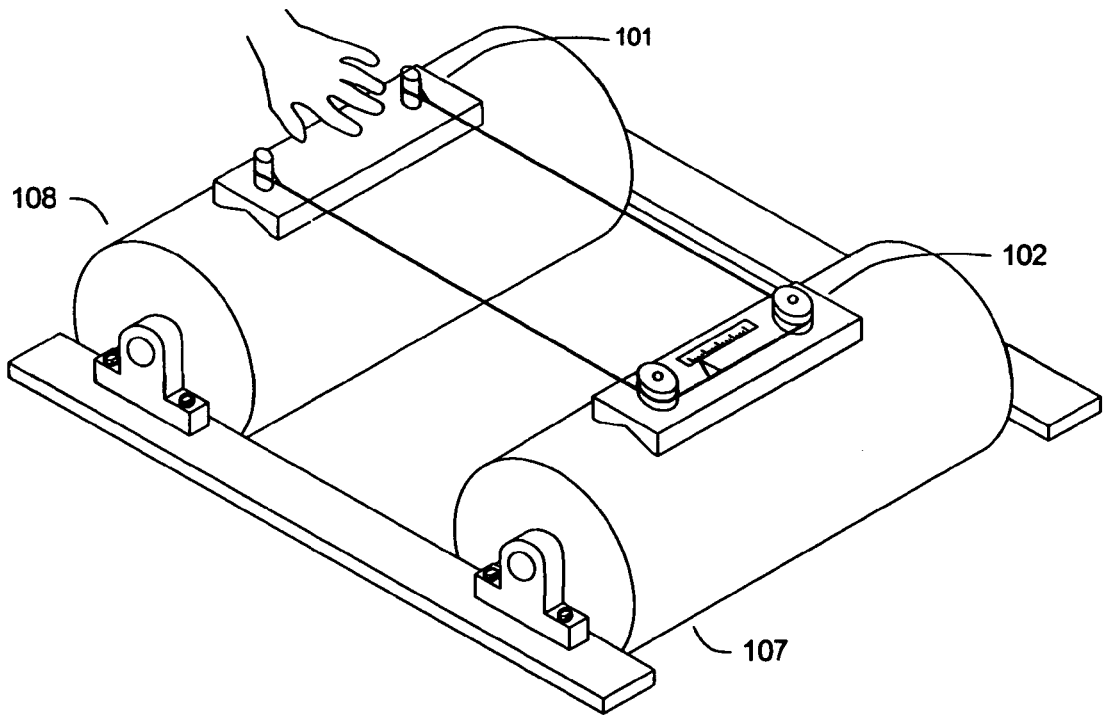

FIGS. 1A and 1B show a preferred embodiment where the angular orientation between two nearly parallel rolls is measured. FIG. 1A shows two mounting frames, 101 and 102, which are temporarily placed on two rolls, 107 and 108, to be measured. Two pins 103 are fixed to mounting frame 101 where the continuous string 104 is looped or tied off. Two small rotating disks 105 are attached to mounting frame 102 in a manner that allows them to freely rotate about their centers. Preferably, the rotating disks 105 have low friction rotational bearings and a small radius. A pointer and scale 106 is used to monitor the position of the string between the two rotating disks 105. The pointer is attached to the continuous string 104 and the scale is attached to the mounting frame 102. Either of the two rolls, 107 and 108, can be rotated slightly by hand to provide an even string tension after the string ends are terminated on pins 103. In FIG. 1A, a first scale reading is taken.

FIG. 1B shows the same two rolls, 107 and 108, with the mounting frames reversed which will cause the string to shift on mounting frame 102 due to the orientation change between the two mounting frames 101 and 102. A second scale reading is taken after the same tension is placed on the string by slightly rotating the rolls. It is preferable that mounting frames, 101 and 102, are reversed so that the same positions on the two rolls, 107 and 108, are reused. However, minor position changes will not cause accuracy problems provided that the mounting frames, 101 and 102, are aligned to the two rolls, 107 and 108, accurately.

Figure 2:
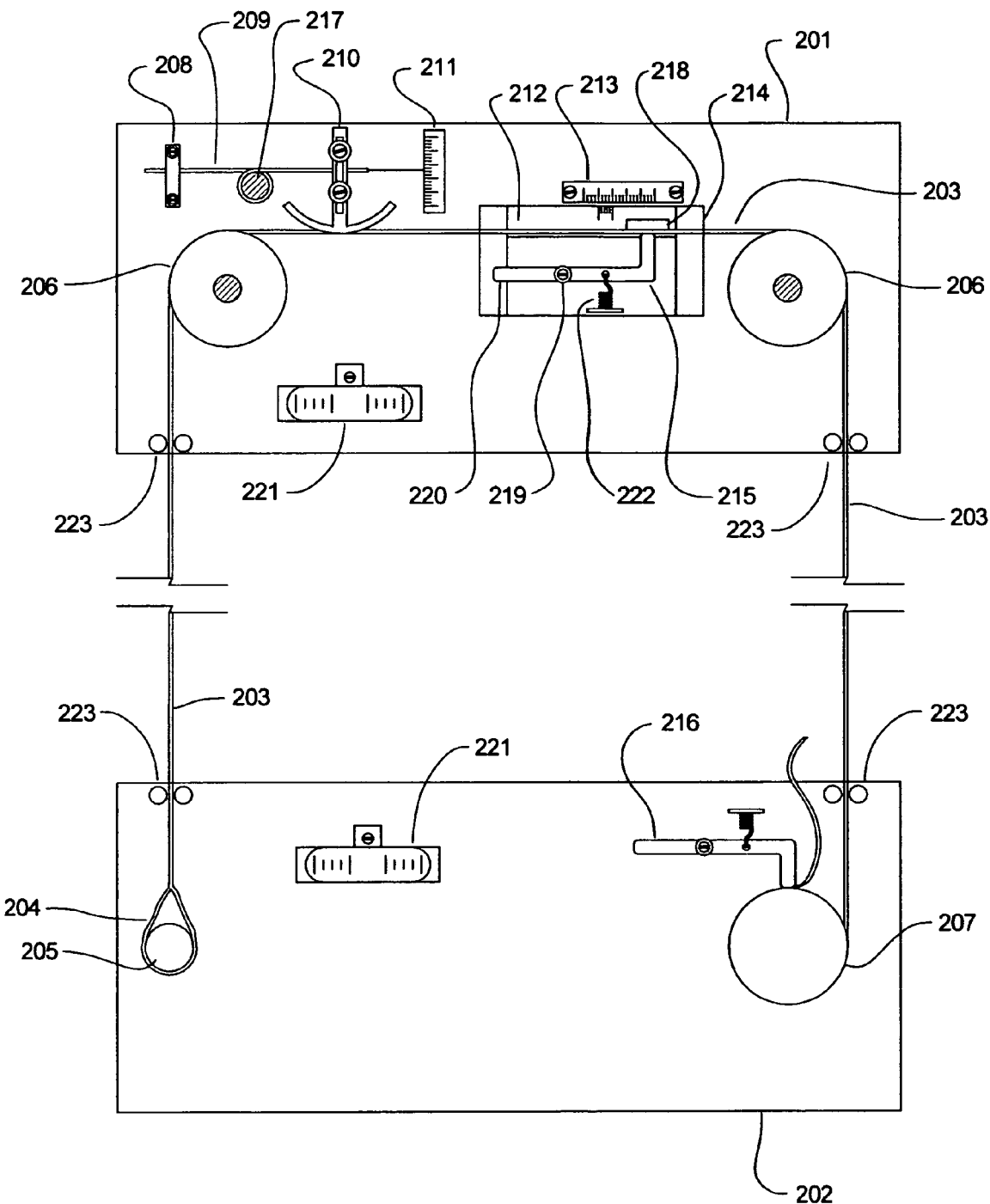
FIG. 2 shows a detail of a how the shift in position of the string may be measured and how string tension may be monitored.

FIG. 2 shows a detail of a how the shift in position of the string may be measured and how string tension may be monitored. Mounting frames 201 and 202 are each aligned to the two surfaces (not shown) to be measured. Continuous string 203 is looped around pin 205 by using an end loop 204. Alternately, the string could be tied off with a not. The continuous string 203 is routed through two rotating disks 206, a groove in slider plate 212, and wrapped around pin 207. String clamp 216 holds the string rigidly against pin 207 which fixes the continuous string 203 length.

Light string tension is provided by a string tensioning unit which comprises a torsion spring 209 which pushes a tensioning bar 210 against the continuous string 203. The torsion spring 209 is adjusted by changing the torsion spring end under clamping bar 208. The torsion spring 209 is installed over pin 217 that is fixed to mounting frame 201. A tension indicating scale 211 shows the amount of deflection of the tensioning bar 210 which indicates the amount of tension against the string. The tensioning bar 210 is constrained to move in only one direction by a grooved slot or similar arrangement on mounting frame 201 so it will press against the string. A suitable groove for the string may be added to the contact surface of the tensioning bar 210 to keep the string in a defined path.

The continuous string 203 is preferably kept in a defined path by providing suitable grooves in disks 206, pin 205, and pin 207. It is important that the disks 206 are completely free to rotate for the light string tension used.

A slider plate 212 freely slides in only one direction in groove 214. A string clamping bar 215 rotates about a screw 219 which is attached to the slider plate 212. A spring 222 keeps the string clamp 215 pressed against the string 203 and press plate 218. A gap for the continuous string 203 may be easily established when an operator presses against the end 220 of the string clamping bar 215. The change in string position is read off of vernier scale 213. For convenience, vial levels 221 have been added to each mounting frame. Four pairs of string guiding pins 223 keep the string path clearly defined on each mounting frame.

Figure 3A:
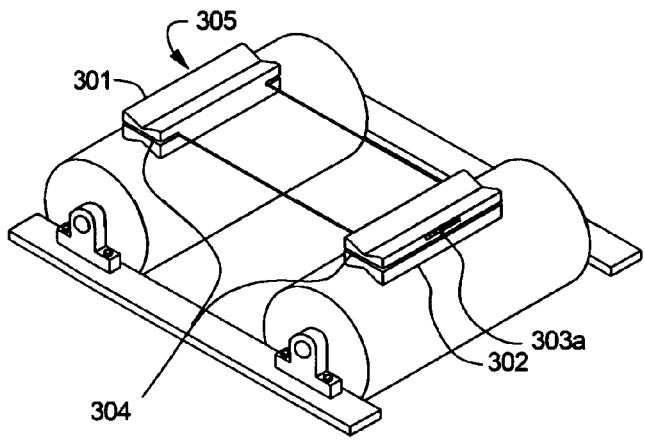
FIGS. 3A, 3B, and 3C show a preferred embodiment where the orientation angle is determined by flipping the mounting frames over.
Figure 3B:
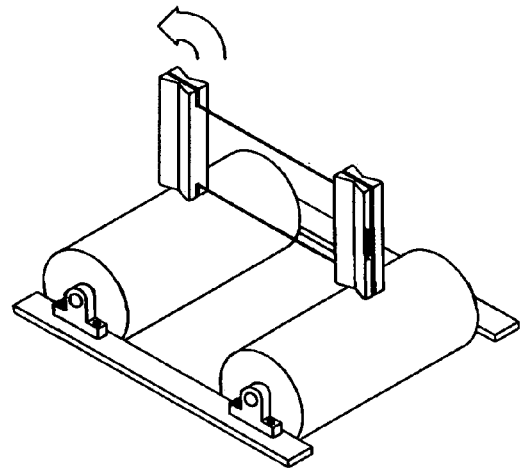
Figure 3C:
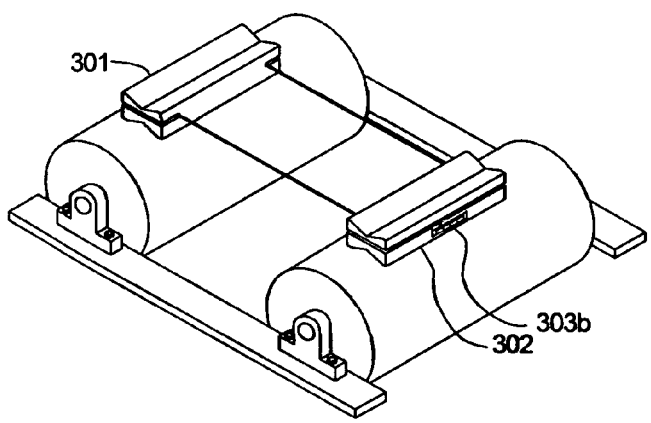

FIGS. 3A, 3B, and 3C show a preferred embodiment where the mounting frames are each designed to incorporate two symmetrical mounting surfaces. In FIG. 3A the first mounting frame 301 and second mounting frame 302 are placed on the rolls to be measured. The continuous string is routed as shown with two string terminating points (not shown) on the non-visible side 305 of first mounting frame 301. A first reading from the string position indicating instrument 303a is then taken. The second v groove on each mounting frame allows the frames to be flipped over as illustrated in FIG. 3B and placed at the same roll location as illustrated in FIG. 3C. A second reading from the string position indicating instrument 303b is then taken.

The term "flipped over" in this application means to lift the two mounting frames away from the surfaces they are aligned to, rotate them 180 degrees, and set them on the same surfaces in approximately the same locations, so that both mounting frames are upside down with respect to their previous orientation to the surfaces. The term would also include any other rotations that accomplish the same end result.

In FIG. 3A, the continuous string is routed between the two mounting frames by machined grooves 304 rather than pins and rotating disks. This is also a satisfactory way to make an angular measurement, provided however, that the continuous string is completely free to slide within the groove and not bind in any way. Optionally, rotating disks, low friction materials, polished pin shafts, and rounded corners may be included within any groove to ensure free string movement.

The string position indicating instrument may be placed anywhere suitable on the mounting frame. In FIGS. 3A and 3C it is located on a side of the unit. Alternately, the string path could be routed so that the instrument is located on any exposed surface. The instrument could also be movable or rotated for easy viewing. The location can be chosen for convenience as well as practicality.

For small angle measurements, the two mounting frames and the string segments between mounting frames will approximate a rectangular shape. Equally accurate results will be obtained if the shape is somewhat closer to a parallelogram. It is not necessary that the string segments between the two frames be exactly perpendicular to the frames for an accurate orientation measurement.

Figure 4:
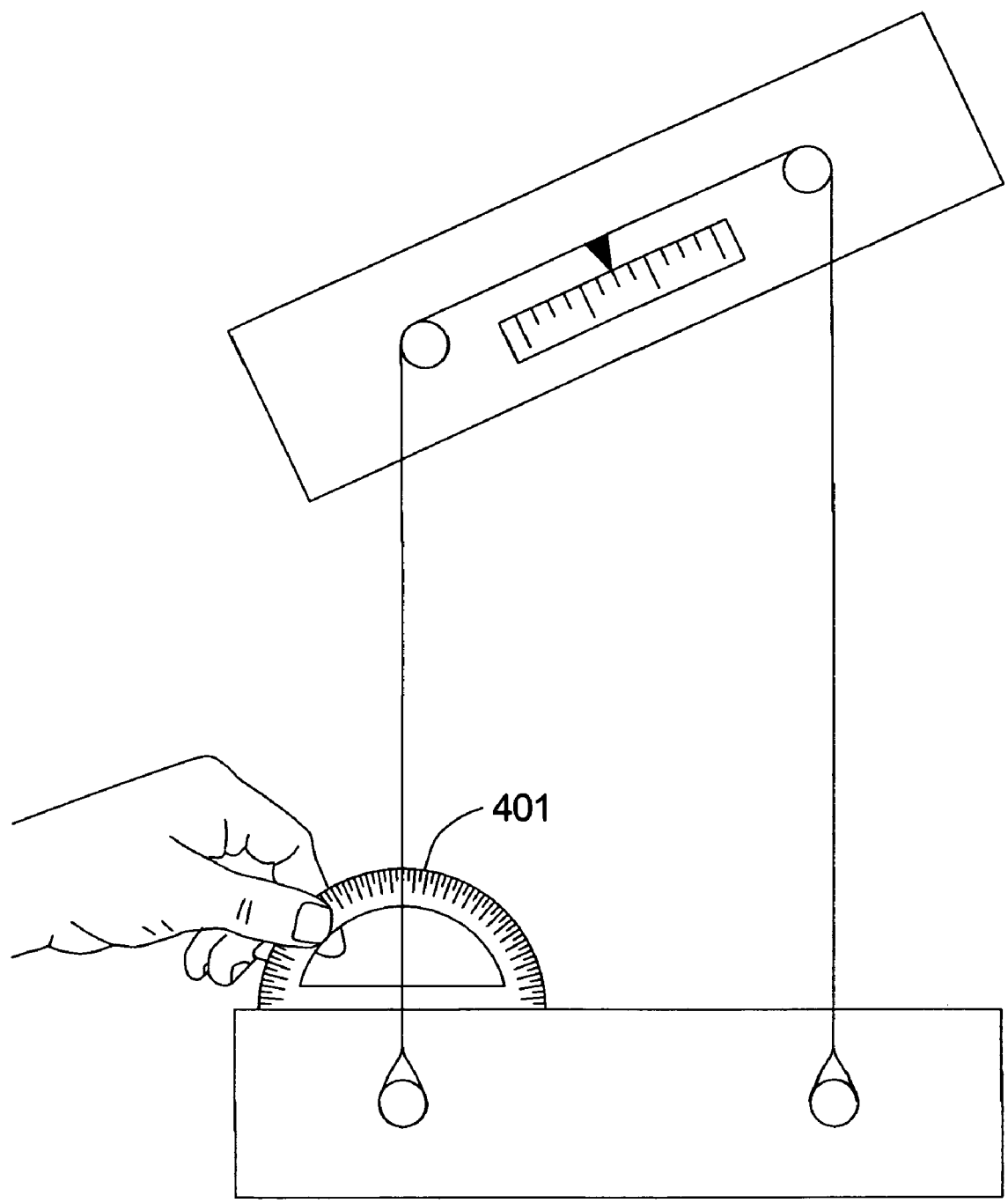
FIG. 4 shows a preferred embodiment where the string segment angle relative to a frame is measured by an operator.

For larger angle measurements more than 5°, the two mounting frames and the string segments between the mounting frames will be a four sided polygon. It will not be a rectangle or a parallelogram. In this case, it is helpful and more accurate for the two string segments to be symmetric about the center of one frame. This will make the calculation more predictable and lessen the need for complicated correction factors. The symmetry can be measured and controlled by accurate placement of the two mounting frames on the two surfaces. In FIG. 4, the angle of each string segment relative to the first mounting frame is measured by a protractor 401. This can be done with a protractor that is fixed to the mounting frame, or simply held in place by the operator as illustrated in FIG. 4. Each string segment may be measured and the frame positions adjusted accordingly.

Figure 5:
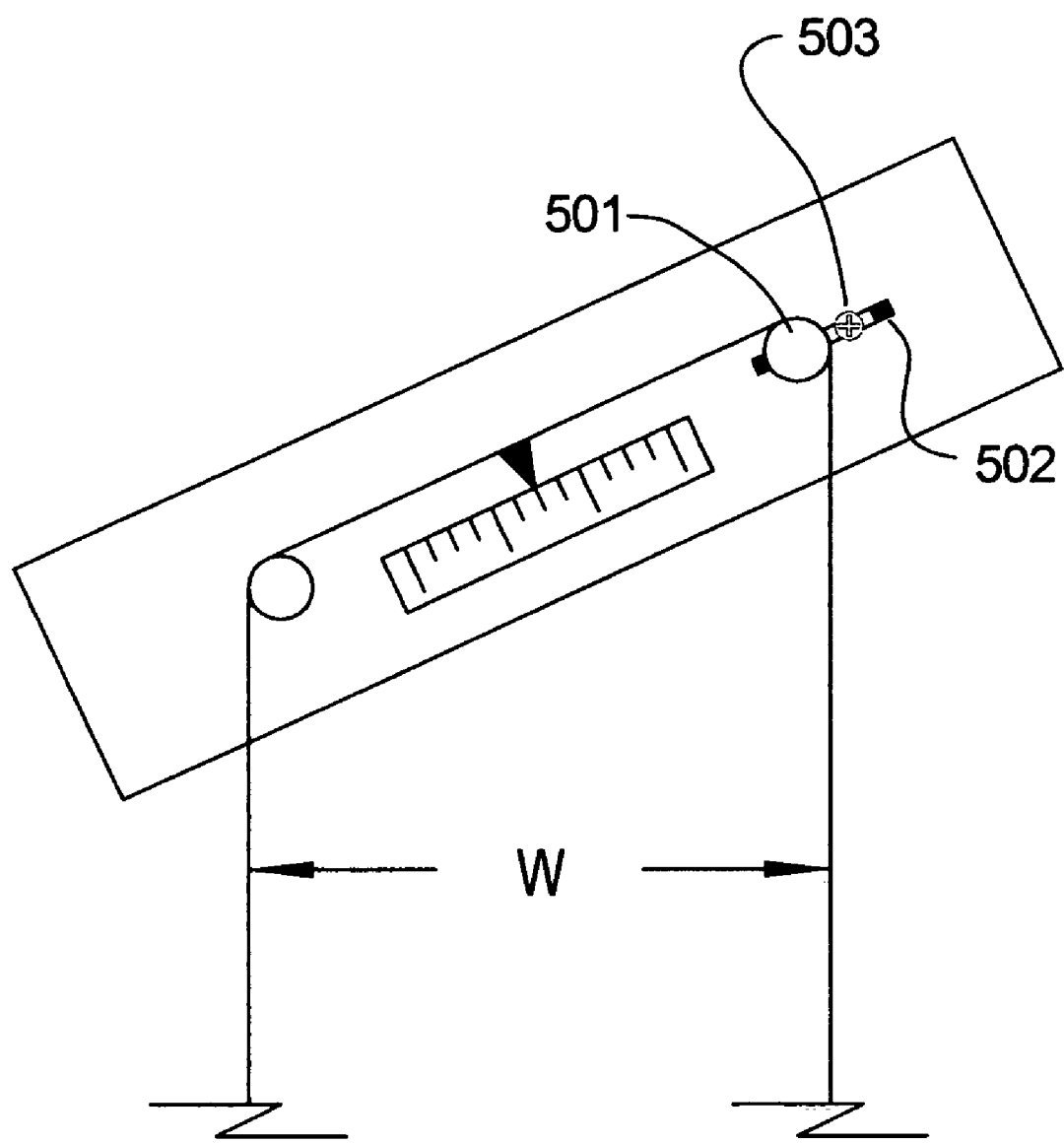
FIG. 5 shows a preferred embodiment where the defined path on a mounting frame is adjustable.

FIG. 5 shows a preferred embodiment where the defined path on the second mounting frame is adjustable. The position of a pin 501 may be varied in a slot 502 and locked into position by clamping screw 503. The operator measures the width of the two string segments between the two mounting frames with a ruler, steel tape, or similar instrument. He may then adjust the position of pin 501 so that the two string segments are parallel. For this case, the calculation of the angle β is a little different.

$$\beta = \tan^{-1}\left(\frac{Reading1 - Reading2}{W}\right) \quad (2)$$

In this case W is the distance between the parallel string segments.

Other movable pins or grooves could be added to either frame to accomplish the same end result of keeping the two string segments between the flames parallel.

While various embodiments of the present invention have been described, the invention may be modified and adapted to various angular measurements to those skilled in the art. Therefore, this invention is not limited to the description and figures shown herein, and includes all such changes and modifications that are encompassed by the scope of the claims.

I claim:

1. A method to measure the orientation angle between two surfaces comprising:
    A. a first frame that is aligned to a first of said two surfaces,
    B. a second frame that is aligned to a second of said two surfaces,
    C. a continuous string that is routed in a defined path from said first frame to said second frame and ending at said first frame,
    D. where said defined path incorporates two segments between said first frame and said second frame,
    E. where said two segments define a plane,
    F. where said continuous string is placed under tension a first time and a position of said continuous string relative to said second frame is monitored,
    G. where said first frame and said second frame are realigned to said two surfaces in a way that causes said position of said continuous string to change in a predictable manner on said second frame when placed under tension a second time,
    H. where said predictable manner is related to said orientation angle between said two surfaces,
    whereby said orientation angle between said two surfaces is determined in said plane.

2. The method according to claim 1 where a string tension indicator unit provides a tension indication of said continuous string.

3. The method according to claim 1 where a level vial is attached to at least one of said first frame and said second frame.

4. The method according to claim 1 where at least one of said two surfaces is the radial surface of a cylinder.

5. The method according to claim 1 where said defined path is adjusted so that said two segments incorporated in said defined path are substantially the same distance apart.

6. An apparatus used to measure the angular orientation between two surfaces comprising:
    A. a first frame that is aligned to a first of said two surfaces,
    B. a second frame that is aligned to a second of said two surfaces,
    C. a continuous string that is routed in a defined path from said first frame to said second frame and ending at said first frame, D. where said defined path incorporates two segments between said first frame and said second frame,
E. where said two segments define a plane,
F. where said continuous string is placed under tension a first time and a position of said continuous string relative to said second frame is monitored,
G. where said first frame and said second frame are realigned to said two surfaces in a way that causes said position of said continuous string to change in a predictable manner on said second frame when placed under tension a second time,
H. where said predictable manner is related to said orientation angle between said two surfaces, whereby said orientation angle between said two surfaces is determined in said plane.

\* \* \* \* \*